United States Patent
Lhenry

[11] Patent Number: 5,279,038
[45] Date of Patent: Jan. 18, 1994

[54] DEVICE FOR MEASURING THE ANGULAR POSITION OF A COMPONENT WHICH IS ROTATABLY DISPLACEABLE RELATIVE TO A FIXED COMPONENT, ESPECIALLY OF A TELESCOPE MOUNTING IN RELATION TO ITS SUPPORTING STRUCTURE

[75] Inventor: Bernard Lhenry, Le Creusot, France

[73] Assignee: Framatome, Courbevoie, France

[21] Appl. No.: 854,813

[22] Filed: Mar. 19, 1992

[30] Foreign Application Priority Data

Mar. 19, 1991 [FR] France .................. 91 03337

[51] Int. Cl.⁵ .............................................. G01B 11/26
[52] U.S. Cl. ........................................ 33/1 N; 33/1 PT;
    33/1 N, 1T; 1PT, 285, 534, 356/138; 250/231.13
[58] Field of Search ............... 33/1; 356/138, 153;
    250/231.13

[56] References Cited

U.S. PATENT DOCUMENTS

| | | | |
|---|---|---|---|
| 3,941,345 | 3/1976 | Stripling et al. | |
| 3,966,327 | 6/1976 | Hanson | 356/138 |
| 4,093,383 | 6/1978 | Feist et al. | 33/1 T |
| 4,126,394 | 11/1978 | Ulrich . | |
| 4,451,148 | 5/1984 | Magee | 356/138 |
| 4,466,189 | 8/1984 | Tobin, Jr. | 33/1 T |
| 4,620,092 | 10/1986 | Hara . | |
| 4,632,547 | 12/1986 | Kaplan et al. | 356/247 |
| 4,771,545 | 9/1988 | Hisayasu et al. | 33/1 PT |
| 5,103,090 | 4/1992 | Weiner et al. | 250/231.13 |
| 5,110,210 | 5/1992 | Fay et al. | 356/150 |

FOREIGN PATENT DOCUMENTS

| | | | |
|---|---|---|---|
| 3901876 | 8/1989 | Fed. Rep. of Germany . | |
| 0175205 | 10/1982 | Japan | 356/138 |
| 1215004 | 2/1986 | U.S.S.R. | 33/1 N |
| 1245885 | 7/1986 | U.S.S.R. | 33/1 N |
| 1585680 | 8/1990 | U.S.S.R. | 33/534 |

*Primary Examiner*—Thomas B. Will
*Attorney, Agent, or Firm*—Pollock, Vande Sande & Priddy

[57] ABSTRACT

The device includes an incremental optical encoder (3) comprising two parts, 4,5) which are displaceable in rotation within one another. One part (5) is associated with a movable component (1) and the other part (4) with a fixed component (2) and its output is connected to a device for determining the angular position of the movable component (1) relative to the fixed component (2) on the basis of the relative angular positions of the two encoder parts. The encoder (3) is carried by one of the components (1), and one if its parts (5) is connected to this component (1) while the other part (4) is connected to an optical device for slaving the encoder part in at least one specified orientation in relation to the other component (2).

12 Claims, 3 Drawing Sheets

DEVICE FOR MEASURING THE ANGULAR POSITION OF A COMPONENT WHICH IS ROTATABLY DISPLACEABLE RELATIVE TO A FIXED COMPONENT, ESPECIALLY OF A TELESCOPE MOUNTING IN RELATION TO ITS SUPPORTING STRUCTURE

FIELD OF THE INVENTION

The present invention relates to a device for measuring the angular position of a component which is displaceable in rotation in relation to a fixed component, and especially of a telescope mounting in relation to its supporting structure.

BACKGROUND OF THE INVENTION

In certain machines such as, astronomical apparatuses and more particularly telescopes, it is important to be able to measure in an extremely precise manner the angular position of a component which is displaceable in rotation in relation to a fixed component.

This is so, for example, in the case of a telescope mounting which is displaceable in rotation within a supporting structure for the same and more particularly where it is desired to measure the azimuth angle or the elevation angle of this mounting.

In fact, these measurements must be made in an extremely precise manner with a very high resolution.

In the prior art, a certain number of devices are already known which permit the measurement of the angular position of a component which is movable in relation to a fixed component.

Thus, for example, it is possible to make use of an incremental optical encoder in the extension of the movable component, one of the parts of this encoder being fixed and being connected to the fixed component, while the other part is mounted so as to be displaceable in rotation within the fixed part and is connected to the movable component.

The output of this encoder is connected to means for determining the angular position of the movable component in relation to the fixed component on the basis of the relative angular position of the two encoder parts.

Any coupling means may be employed to connect the movable part of the encoder and the movable component of which it is necessary to measure the angular position in relation to the fixed component.

The structure of these coupling means must comply with a certain number of requirements in order not to disturb the measurement, while accepting certain defects of coaxiality between the components, these defects being due, for example, to the imperfect nature of the supporting bearings for the movable component. This leads to the construction of coupling means which are extremely complex and costly and which are relatively difficult to implement and maintain.

Furthermore, it is not always easy to have direct access to the end of the movable component in order to connect this end to the movable part of the encoder.

In order to solve the latter problem, use has been made of other devices comprising an encoded strip fixed, for example, to the periphery of the movable component. This strip is associated with any reading means which are disposed facing this strip, for example on the fixed component, and the output of which is connected to the means for determining the angular position of the movable component in relation to the fixed component.

However, the precision of these devices is dependent on the size of the assembly.

Furthermore, these devices are extremely sensitive to the clearances for mounting of the movable component within the fixed component, to thermal expansions or to the mechanical stresses to which these two components are subjected, so that in order to obtain an acceptable precision it is necessary to multiply the reading means at the periphery of the strip and to undertake comparisons and an in situ calibration of these devices in relation to a conventional standardization incremental optical encoder.

The validation of these calibrations requires a fidelity of the observed phenomena; in certain applications, this is impossible to obtain, so that the desired precision cannot always be obtained with these devices.

SUMMARY OF THE INVENTION

It is an object of the invention is to solve these problems by providing a measuring device the structure of which is simple and reliable, which is inexpensive and which permits the angular position of a movable component in relation to a fixed component to be measured in a very precise manner, irrespective of the environment of these components.

To this end, the subject of the invention is a device for measuring the angular position of a component which is displaceable in rotation in relation to a fixed component, especially of a telescope mounting in relation to its supporting structure of the type comprising an incremental optical encoder comprising two parts which are displaceable in rotation within one another, one of associated with the movable component and the other with the fixed component and the output of which is connected to means for determining the angular position of the movable component in relation to the fixed component, on the basis of the relative angular position of the two encoder parts. The optical encoder is carried by one of the components, one of the parts thereof being connected to this component and the other being connected to optical means for the slaving of this encoder part in at least one specified orientation in relation to the other component.

Advantageously, the slaving means comprise a beam autocollimation glass associated with at least one optical rule carried by the other component, to control a motor for the slaving of the orientation of the corresponding encoder part.

According to various embodiments, the autocollimation glass may be associated with one, two or four optical rules, regularly distributed around the component carrying the encoder, and delimiting as many possible orientations for the slaving of the corresponding encoder part.

BRIEF DESCRIPTION OF THE DRAWINGS

The invention will be better understood with the aid of the description which follows, which is given merely by way of example and with reference to the accompanying drawings, in which.

DESCRIPTION OF THE PREFERRED EMBODIMENT

Figure 1:
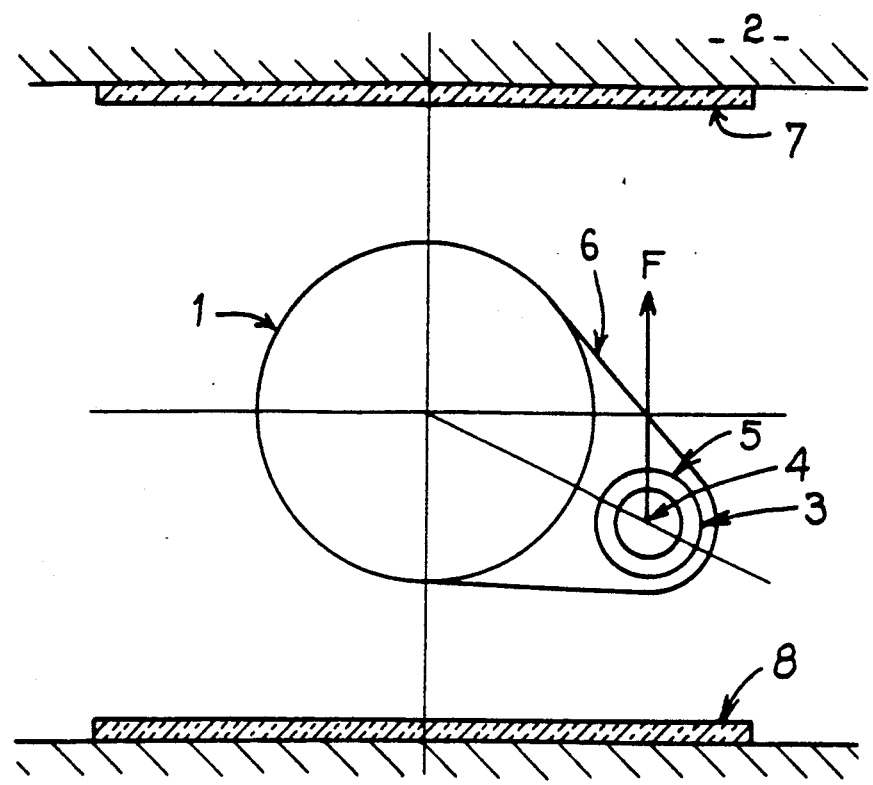
FIG. 1 is a schematic view illustrating the functioning of a first embodiment of a device according to the invention.

As shown in FIG. 1, a measuring device according to the invention is adapted to measure the angular position of a component 1 which is displaceable in rotation in relation to a fixed component 2 and, for example, the position of a telescope mounting in relation to a supporting structure for the same.

The device according to the invention comprises an incremental optical encoder 3, comprising in a manner known per se two parts 4 and 5 which are displaceable in rotation within one another, a first part 5 of which is associated with the movable component 1 and a second part 4 with the fixed component 2.

The output of this encoder is connected in a manner known per se to means for determining the angular position of the movable component in relation to the fixed component, on the basis of the relative angular position of the two encoder parts.

These various means are based on the counting up or the counting down of gaps in the output signals of the encoder and are well known in the prior art, so that no detailed description thereof will be given.

According to the invention, the optical encoder 3 is carried by the movable component 1, and more particularly by a supporting arm 6 projecting radially from this movable component 1 in such a manner that the encoder is entrained in the course of the rotation of the movable component within the fixed component.

The part 5 of the encoder is connected to this movable component, and more particularly to its supporting arm 6, while the other part thereof, i.e., the part designated by the reference 4 in this figure, and which in this case is constituted by the movable part of the encoder, is connected to means for the slaving of this encoder part, in at least one specified orientation in relation to the fixed component.

This orientation is designated by the arrow F in FIG. 1.

These slaving means may be of any known type such as, for example, a beam autocollimation glass associated with at least one optical rule, for example 7, carried by the fixed component, to control a motor for the slaving of the orientation of the movable encoder part in relation to the fixed component.

The design is, in fact, such that the encoder is carried by the movable component and is displaced together with the latter.

However, the movable encoder part 4 is connected to means for slaving in a specified orientation in relation to the fixed component, so that in the course of the rotation of the movable component, and thus of the displacement of the encoder, the part 4 of the latter remains in the specified orientation in relation to the fixed component, and a relative displacement in rotation of the encoder part 5 in relation to the encoder part 4 then takes place.

By processing the output signals of this encoder, it is thus possible to determine, as in the prior art, the angular displacement of these encoder parts in relation to one another and thus of the movable component in relation to the fixed component.

In the embodiment shown in FIG. 1, the beam autocollimation glass is associated with two optical rules disposed on either side of the movable component, facing one another and designated by the references 7 and 8.

The beam autocollimation glass slaving means are well known in the prior art. These means comprise an autocollimation glass associated with means for determining an error signal controlling a torque motor permitting the orientation of the optical beam of this glass, permanently in a specified orientation. More particularly, in the example illustrated, this beam is oriented perpendicularly to one or the other of the optical rules 7 or 8, making use of the error signal supplied by the glass for the purpose of maintaining the movable encoder part in an orientation associated with one of the rules.

Thus, the design is such that the various above-mentioned problems concerning the precision of measurement associated with the relative positioning of the movable component in relation to the fixed component, with the deformations due to thermal expansions and with the mechanical stresses applied to the components, are solved to the extent that the device according to the invention comprises only an optical slaving of the position of one of the encoder parts in relation to the fixed component.

It will be noted, with regard to FIG. 1, that the axis of rotation of the movable part of the encoder is parallel to the axis of rotation of the movable component and that the axis of the beam autocollimation glass is almost perpendicular to the axis of the encoder.

In the embodiment shown in FIG. 1, the autocollimation glass is associated with two optical rules facing one another on either side of the movable component in order to permit the measurement of the angular position of the movable component in relation to the fixed component irrespective of the angular position of the latter.

In fact, the slaving means are adapted to slave the orientation of the movable encoder part in relation to one or the other rule in the course of the rotation of the movable component in relation to the fixed component, this being so for the purpose of avoiding dead angles.

In fact, in the case where a single rule is employed, it is not possible to determine the angular position of the movable component in relation to the fixed component over a complete turn of this movable component to the extent that, during a part of their displacement, the autocollimation glass and the encoder pass behind the movable component, which masks the optical rule, thus preventing the slaving means from performing their function. It is for this reason that, in this embodiment, two optical rules are employed.

It is likewise possible to provide two optical rules at 90° in relation to one another.

Figure 2:
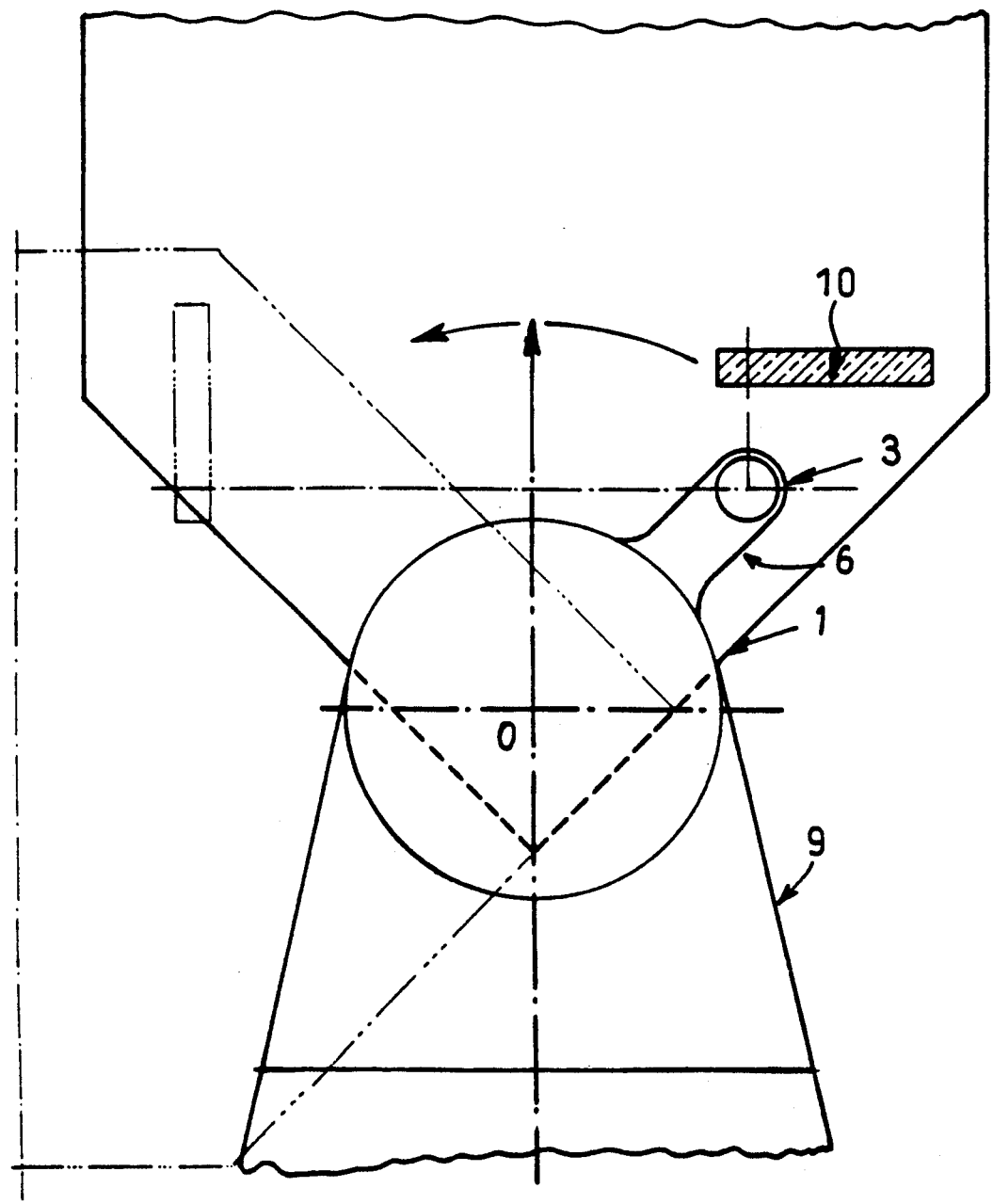
FIG. 2 is a schematic view illustrating the functioning of a second embodiment of a device according to the invention.

FIG. 2 shows another embodiment of a measuring device according to the invention, in which embodiment the optical encoder 3 is disposed at the end of a supporting arm 6 projecting radially from the fixed component 9, while an optical rule 10 is fixed on the movable component. Accordingly, this arrangement is opposite to that shown in FIG. 1, to the extent that in this case it is the rule 10 which is displaced in relation to the encoder in order to follow the displacements of the movable component of the telescope.

The optical encoder is still equipped with means for the slaving of the movable part of the encoder in a specified orientation in relation to this optical rule, so that, when the movable part of the telescope is displaced, giving rise to a displacement of the optical rule, the slaving means are adapted to slave the position of the movable part of the encoder, in order to follow these displacements of the optical rule 10 and thus of the movable part of the telescope; this permits, by processing of the output signals of the encoder, the determination of the angular displacement of the movable part of the telescope in relation to the fixed part.

Figure 3:
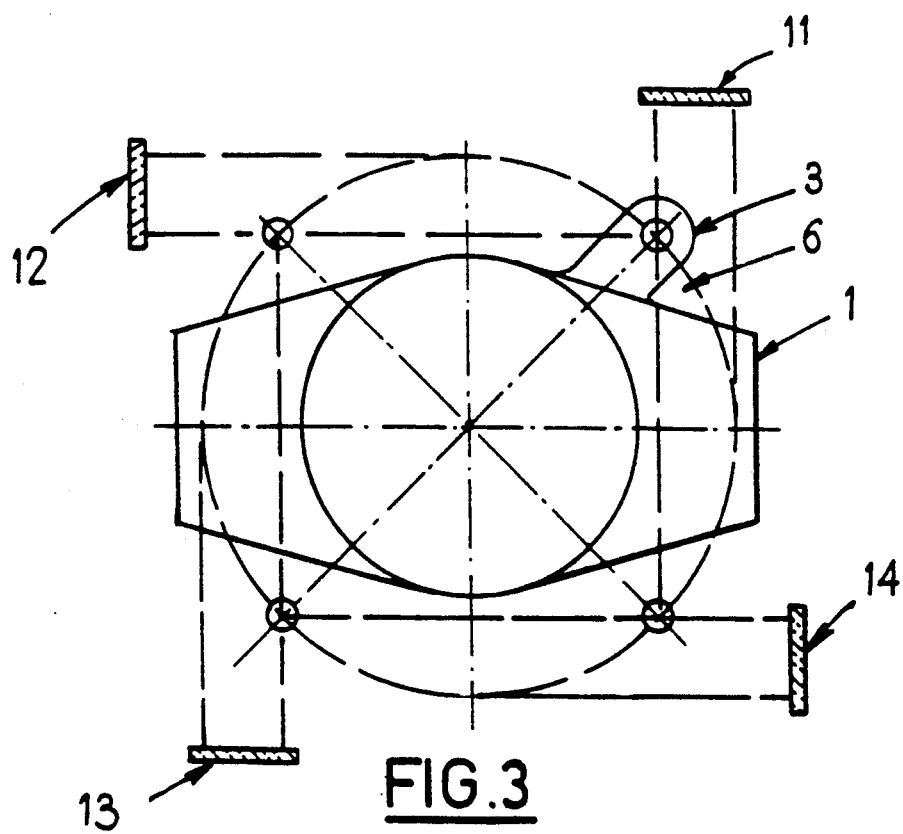
FIG. 3 is a schematic view illustrating the functioning of a third embodiment of a device according to the invention.

In FIG. 3, in which an encoder arrangement similar to that of FIG. 1 is employed, four optical rules, 11, 12, 13 and 14, respectively, are regularly distributed at 90° in relation to one another about the movable component, in such a manner as to delimit four slaving orientations at 90°.

This arrangement also permits the monitoring and the measurement of the angular position of the movable component 1 in relation to the fixed component 2, irrespective of what that position might be, in the course of a complete rotation of the movable component 1.

In this case, the slaving means are also adapted to slave the orientation of the second encoder part in relation to each rule in the course of the rotation of the movable component in relation to the fixed component.

Figure 4:
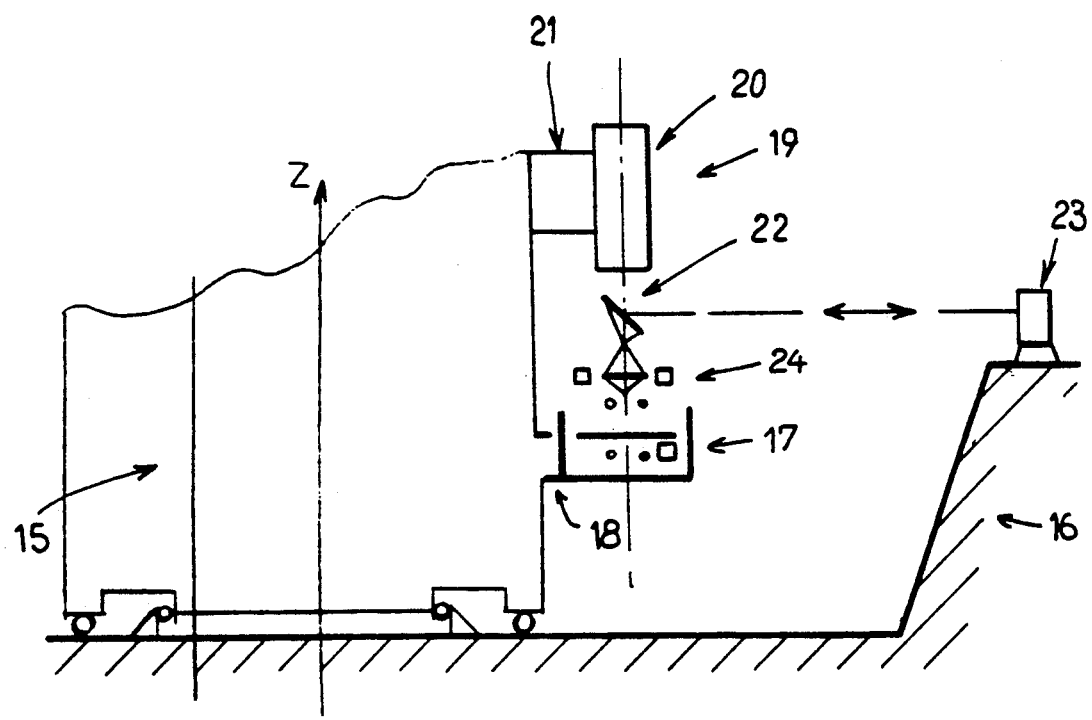
FIG. 4 is a schematic view illustrating the functioning of a fourth embodiment of a device according to the invention.

FIG. 4 shows yet a further embodiment of a device according to the invention.

This device still permits the measurement of the angular position of a movable component 15 in relation to a fixed component 16 and comprises an incremental optical encoder 17 fixed to the end of a supporting arm 18, extending radially from the movable component 15.

This optical encoder is connected in a conventional manner to means for determining the angular position of the movable component in relation to the fixed component on the basis of the position of the movable part of the encoder in relation to the fixed part.

The fixed part of the encoder is, in fact, connected to the movable component 15, while the movable part is connected to slaving means 19 permitting this movable encoder part to be held in at least one specified orientation in relation to the fixed component 16.

In this embodiment, these slaving means likewise comprise an autocollimation glass 20 fixed to the end of a supporting arm 21 extending radially from the movable component 15 and the axis of which is parallel or even coincident with the axis of the encoder.

Means 22 for the 90° deflection of the beam of the autocollimation glass are also provided in order to direct this beam in the direction of at least one optical rule 23 disposed on the fixed component 16.

These slaving means still comprise a torque motor 24 adapted to slave the orientation of the movable encoder part in at least one specified orientation, on the basis of the output error signal of the autocollimation glass, and thus to permit the measurement of the angular position of the movable component in relation to the fixed component.

Thus, in this embodiment the beam autocollimation glass is carried by an arm 21 extending radially from the movable component 15, and its axis is coincident with the axis of the encoder, while deflecting means are employed to direct the beam therefrom in the direction of the optical rule 23.

In the embodiments shown in FIGS. 1 to 3, this glass may be carried directly by the movable encoder part and may extend perpendicularly to the axis of rotation of this encoder part, so that the beam of the latter is directed directly towards the rules.

Other embodiments may be employed in particular for the slaving means.

Accordingly, the design is such that the reinitialization of the measuring device according to the invention is very simple, in that it may be effected when the telescope is stationary by turning the movable part of the encoder to reach an initialization position to integrate a reference position in the means for processing the output signals of this encoder, and by then returning this movable encoder part to the slaving position in relation to the corresponding optical rule.

There is thus provided a means permitting knowledge of the absolute position of the movable part of the telescope without displacing that movable part, in a quasi-instantaneous manner.

I claim:

1. Device for measuring the angular position of a component which is displaceable in rotation in relation to a fixed component, of the type comprising an incremental optical encoder comprising two parts which are displaceable in rotation within one another, one part being associated with the movable component and the other part being associated with the fixed component and the output of which is connected to means for determining the angular position of the movable component in relation to the fixed component on the basis of the relative angular position of the two encoder parts, the encoder being carried by one of the components, one of the parts thereof being connected to said one component and the other part being connected to optical means for the slaving of this encoder part in at least one specified orientation in relation to the other component, the slaving means comprising a beam autocollimation glass associated with two optical rules carried by the other component to control a motor for the slaving of the orientation of the corresponding encoder part, said two optical rules delimiting two slaving orientations of the corresponding encoder part.

2. Device according to claim 1, wherein the two optical rules are disposed facing one another, on either side of the component carrying the encoder.

3. Device according to claim 1, wherein the two optical rules are disposed at 90° to one another around the component carrying the encoder.

4. Device according to claim 1, wherein the autocollimation glass is associated with four optical rules which are disposed at 90° in relation to one another around the component carrying the encoder.

5. Device according to claim 1, wherein the slaving means are adapted to slave the orientation of the corresponding encoder part in relation to each rule in the course of the rotation of the movable component in relation to the fixed component.

6. Device according to claim 1, wherein the encoder and the slaving means are disposed at the end of at least one supporting arm extending radially from the component carrying the encoder.

7. Device according to claim 6, wherein the axis of the beam autocollimation glass is substantially perpendicular to the axis of the encoder.

8. Device according to claim 1, wherein the axis of the autocollimation glass is substantially parallel to the axis of the encoder, and including means for 90° deflection of the beam of the glass in the direction of said at least one rule.

9. Device according to claim 8, wherein the axis of the glass is coincident with the axis of the encoder.

10. Device according to claim 8, wherein the axis of the glass is fixed to an end of a supporting arm extending radially from the component carrying the encoder.

11. Device according to claim 1, wherein the encoder is carried by the movable component and each optical rule is carried by the fixed component.

12. Device according to claim 1, wherein the encoder is carried by the fixed component and each optical rule is carried by the movable component.

* * * * *